Patented Sept. 30, 1952

2,612,480

UNITED STATES PATENT OFFICE 2,612,480

PRINTING INK

Merrill R. May, Brooklyn, N. Y., assignor to Sun Chemical Corporation, Long Island City, N. Y., a corporation of Delaware No Drawing. Application September 6, 1950, Serial No. 183,478

8 Claims. (Cl. 260—4)

1

The present invention relates to printing inks, and more particularly, to printing inks especially adapted for imprinting polyethylene film.

One object of the present invention is to provide printing inks which, when imprinted upon polyethylene film, exhibit a pliability, flexibility and elasticity comparable to the polyethylene film base.

Another object of the present invention is to provide printing inks which, after imprinting upon a polyethylene film base, may be subjected to a subsequent thermal treatment to become fused to said polyethylene film base and to thereby become a substantially integral part of the said polyethylene film.

Another object of the present invention is to provide printing inks which, when imprinted upon polyethylene film and subjected to a subsequent thermal treatment, display a high degree of adhesion thereto and which will not peel or flake off the said polyethylene film even under severe conditions of usage or handling of the film.

Other objects of the present invention will be apparent from the following description and appended claims.

The development of successful commercial printing inks especially adapted for imprinting polyethylene film has been hindered due to the very nature of such film, and due to the specific properties and characteristics required of the imprinted ink film. To be satisfactory for successful commercial use in imprinting polyethylene film, the imprinted ink film of such printing inks should be as pliable and as flexible as the polyethylene film itself, and should also have the ability to withstand distortion of the polyethylene film without the loss of adhesion of the imprinted ink film to the polyethylene film or the breaking of the imprinted ink film. Furthermore, the ink film should display such a degree of adhesion to the polyethylene film upon which it is imprinted that it will not crack, flake off, or peel off the base film even under severe conditions of handling or usage of the said film. The imprinted ink film must furthermore be capable of resisting the tearing action of tacky or adhesive materials placed thereon and suddenly removed as may occur in various applications in which such products are utilized. Needless to say, the imprinted ink film itself should be completely dry and free of surface tack.

Polyethylene is a white, horn-like, thermoplastic resinous material, the polymerization product of ethylene subjected to conditions of extremely high temperatures and high pressures. It is a tough, inherently flexible material, resembling paraffin wax in appearance. Polyethylene is further characterized by its chemical inertness, and its resistance towards solution in all the ordinary solvents at low temperatures. The polyethylene resins are characterized by a rather abrupt softening point, the resins generally changing from a solid to a rather soft plastic condition within a comparatively limited temperature range. The softening points of the polyethylene resins, and the degree to which softening of the resins occurs varies, depending generally upon the average molecular weight of the said resins. Polyethylene resins are available commercially having average molecular weights of from approximately 8000 to approximately 19,000, and having softening points within the range of from approximately 140° F. to approximately 230° F. Since these resins are thermoplastic, they may be shaped into sheet-form or into continuous self-sustaining films by the methods ordinarily employed for such operations in the plastics industry. Films of polyethylene thus formed are usually transluscent, unless pigmented before the film-forming operation, and are extremely flexible, lending themselves to such applications as moisture-proof wrapping foils, shower curtains, tablecloths, aprons, and a variety of other uses.

Since polyethylene film is a smooth, substantially non-porous, wax-like material, it affords no penetration to inks imprinted thereon and presents a surface which ordinarily rejects the binding action of the resinous materials commonly utilized as the binders of printing inks. Moreover, polyethlene films are at most but slightly affected at ordinary printing temperatures by the solvents commonly utilized in printing inks so that permanent adhesion of the imprinted ink film by action of the solvent contained in the printing ink upon the surface of the film imprinted has not been successfully obtained. Attempts to obtain permanent adhesion of the imprinted ink to the polyethylene film by fusion of the ink film thereto has not hitherto been satisfactorily successful due to the difference between the nature of the resinous materials employed as the binder materials of such printing inks and that of polyethylene, and further due to the fact that in most cases the temperature required to effect fusion of the imprinted ink film to the polyethylene film base is so high as to cause softening and consequent distortion of the polyethylene film. The term "permanent adhesion"

as employed in the present description implies not only adhesion of an imprinted ink film to a self-sustaining polyethylene film base for an indefinite period of time, but also that the imprinted ink film shall substantially retain its character and appearance as imprinted for prolonged periods of time under such conditions of handling and usage to which the said polyethylene film may be subjected in ordinary commercial applications of such film.

By the present invention there are provided printing inks especially adapted for imprinting polyethylene film, which, when imprinted thereon and subjected to a subsequent thermal treatment as hereinafter described, are fused to the said polyethylene film and have the characteristics of permanent adhesion thereto as defined above. The imprinted ink film of the inks of the present invention is as pliable and as elastic as the polyethylene film upon which it is imprinted and will withstand substantial distortion of the polyethylene film without breaking, cracking, or flaking off from the said polyethylene film. After the thermal treatment mentioned above, the imprinted ink films of the inks of the present invention are completely resistant to stripping of the said ink film from the polyethylene film base by any such action as the sudden removal from contact therewith of tacky or adhesive materials. A severe test which is commonly employed to test such properties in the imprinted ink films of the present invention is the application to the imprinted surface of an adhesive material, as for example, "Scotch Tape," and the sudden and quick tearing away of the said adhesive tape from the polyethylene film. Whereas, ordinary printing inks, when subjected to such treatment, are usually either partly or completely stripped from the polyethylene film in the area to which the adhesive tape had been applied, the printing inks of the present invention withstand such treatment completely without incurring any objectionable changes in the character or appearance of the imprinted ink film.

The printing inks of the present invention comprise a vehicle which contains as the principal dispersing medium thereof an aromatic hydrocarbon solvent, and which contains as the pigment carrying and pigment binding portion thereof a solids or binder composition containing as essential ingredients thereof a polyethylene resin, paraffin wax, and natural rubber or a synthetic rubber material of the class hereinafter set forth. The aromatic hydrocarbon solvent employed in the inks of the present invention may generally be any of those commonly used in printing inks, as for example, xylol, toluol, etc. However, for best results, it is preferable to employ xylol due to its excellent solvent and dispersing action upon the various materials employed as the binder component of the ink vehicles of the present invention. Generally any of the commercially available polyethylene resins and paraffin waxes may be employed as components of the binder portion of the present ink vehicles. With regard to the rubber material component of the binder portion of the present ink vehicles, there may be employed besides natural rubber such synthetic rubber materials as polymerized 2-chloro-butadiene 1,3, polymerized 2,3 dimethyl butadiene, polymerized butadiene 1,3, copolymers of isobutylene and butadiene, copolymers of butadiene and styrene and of butadiene and acrylonitrile, and cyclized synthetic polyisoprene.

To obtain the results described as characteristic of the printing inks of the present invention, the various components of the ink vehicles must be present within certain definite proportions. Thus the polyethylene resin should be employed in amount from approximately 6 to approximately 14 parts by weight and the paraffin may be employed in amount from approximately 3 to approximately 7 parts by weight. However, it is essential that the ratio of polyethylene to paraffin in the vehicle be not less than approximately 2 to 1 and be not greater than approximately 4 to 1. The reason for this is the fact that paraffin, which is substantially mutually soluble with polyethylene, is employed in the inks of the present invention to lower the melting or fusion point of the imprinted ink film so that proper fusion of the imprinted ink film with the base polyethylene film may be had upon subsequent thermal treatment of the imprinted polyethylene film. Too great a ratio of polyethylene to paraffin in the inks of the present invention would result in an imprinted ink film which would be most difficult to fuse to the base polyethylene film. Also, too great a ratio of paraffin to polyethylene would provide an ink film having insufficient adhesion to a base polyethylene film, even after subsequent fusion thereto, to withstand severe usage of the imprinted polyethylene film without deterioration of the imprinted ink film. The rubber material component of the printing inks of the present invention has several functions, a principal one of which is to provide good mechanical adhesion of the imprinted ink film to the base polyethylene film upon which it is imprinted until the imprinted polyethylene film is subjected to the subsequent thermal treatment and fusion of the imprinted ink film to the base polyethylene film occurs. The presence of the said rubber material component also imparts added tack, length, and flow to the inks of the present invention. In fact, were the rubber material component omitted from the inks of the present invention, the inks would have a soupy gel-like consistency, entirely unsuited for satisfactory commercial printing operations. As to the proportions in which this material should be employed, best results have been obtained by utilizing the said rubber material component in an amount from approximately 4 to approximately 10 parts by weight. In order to best obtain the results secured with the printing inks of the present invention as described herein, it is also essential that the binder composition of the ink vehicles of the present invention constitute not less than approximately 20 percent by weight and not more than approximately 30 percent by weight upon the weight of the ink vehicle. Therefore, each of the components of the binder composition of the present inks may be employed in the various proportions outlined with respect to each other, but the binder composition itself should be within the range of from approximately 20 percent to approximately 30 percent by weight of the ink vehicle.

While the above mentioned constituents constitute the essential components of the printing ink vehicles of the present invention, there may also be incorporated therein a resinous material which is soluble in the aromatic hydrocarbon solvents employed in preparing the inks and which forms continuous, homogeneous films when applied from a solution thereof. As examples of resinous materials which may be utilized in addition to the essential binder components previously set forth, there may be mentioned coumarone-indene resins, phenol-modified coumarone-indene resins, limed wood rosin, zinc resinate, ester gum, rosin-maleic anhydride diene resins, rosin-modified phenol-formaldehyde resins, and rosin-modified glycerol-phthalate resins. Incorporation of such resinous materials in the printing inks of the present invention provides increased initial tack and adhesion to the imprinted ink film and results in a harder ink film after fusion. Such resinous materials may satisfactorily be employed in the ink vehicles in an amount up to 7 parts by weight. However, when such resinous materials are employed as a part of the binder composition of the ink vehicles of the present invention, the concentration of the binder composition in the ink vehicles should still be within the range of from approximately 20 percent to approximately 30 percent by weight based upon the weight of the ink vehicle.

Other organic solvents may be utilized in limited amounts as part of the liquid or dispersing medium of the inks of the present invention. Thus aliphatic solvents such as mineral spirits and petroleum naphtha, and ketones such as methyl ethyl ketone and methyl isobutyl ketone may be employed to vary the properties of the ink somewhat as regards their drying rate for example and viscosity. However, these solvents should not be employed in amounts substantially greater than 10 percent by weight based upon the weight of the vehicle since the presence of these solvents decreases the solvent and dispersing power of the aromatic hydrocarbon solvents for the materials employed in the binder composition.

The thermal treatment whereby fusion of the imprinted ink film to the base polyethylene film is obtained need consist of nothing more than suitable application of heat thereto in the temperature range of from approximately 180° F. to approximately 220° F. for a length of time sufficient to effect fusion of the imprinted ink film with the base polyethylene film. This may satisfactorily be accomplished by passing a continuous web of the imprinted polyethylene film over heated rollers or hot water cans, or by passing the imprinted web through ovens heated to a temperature within the range specified. Temperatures substantially in excess of the upper temperature limit set forth above have a tendency to cause distortion of the polyethylene film due to softening of the said film, and it is therefore not recommended that such temperatures be employed in such treatment. It is further not necessary that the imprinted ink film be either freshly imprinted, that is, in a wet condition, or that it be allowed to dry before subjecting the imprinted film to the above thermal treatment. Fusion of the imprinted ink film to the base polyethylene film may be had in either case by the treatment outlined above.

The ink vehicles of the present invention may satisfactorily be prepared by any of the methods commonly utilized in the printing ink industry, it merely be required that a smooth, homogeneous dispersion of the various components of the binder composition in the solvent or dispersing medium be obtained. One satisfactory method of preparing these ink vehicles consists in charging the various components of the ink vehicle to a pebble mill and milling the charge until a smooth, homogeneous dispersion is obtained. The pigment may then be added and the charge milled further to produce the printing inks of the present invention. Before milling the various components of the ink vehicles together, it is generally desirable to effect solution of the rubber material component in a portion of the solvent component, a 20 percent solution of the same being satisfactory, and to incorporate such solution into the vehicle mix. Such procedure will greatly shorten the time in which complete dispersion of the various binder components in the solvent component will be had. The same procedure is also preferably followed when any of the above mentioned aromatic hydrocarbon solvent-soluble resinous materials are employed in the ink vehicles of the present invention.

The following examples are illustrative of successful commercial printing inks prepared according to the present invention.

*Example 1*

| | Parts by weight |
|---|---|
| Polyethylene | 7.2 |
| Paraffin | 3.6 |
| Polymerized 2-chloro-butadiene 1,3 | 3.9 |
| Phenol-modified coumarone-indene resin | 3.6 |
| Xylol | 65.7 |
| Chrome yellow pigment | 16.0 |
| | 100.0 |

*Example 2*

| | |
|---|---|
| Polyethylene | 9.6 |
| Paraffin | 4.4 |
| Polymerized 2-chloro-butadiene 1,3 | 4.8 |
| Xylol | 61.2 |
| Titanium dioxide pigment | 20.0 |
| | 100.0 |

*Example 3*

| | |
|---|---|
| Polyethylene | 12.6 |
| Paraffin | 6.3 |
| Natural rubber | 5.4 |
| Xylol | 65.7 |
| Iron blue pigment | 10.0 |
| | 100.0 |

*Example 4*

| | |
|---|---|
| Polyethylene | 10.2 |
| Paraffin | 3.8 |
| Copolymer of isobutylene and butadiene | 6.8 |
| Xylol | 64.2 |
| Chrome green pigment | 15.0 |
| | 100.0 |

*Example 5*

| | |
|---|---|
| Polyethylene | 7.5 |
| Paraffin | 2.7 |
| Copolymer of butadiene and styrene (25%–26% styrene) | 3.8 |
| Rosin-maleic anhydride diene resin | 5.4 |
| Xylol | 70.6 |
| Carbon black pigment | 10.0 |
| | 100.0 |

*Example 6*

| | |
|---|---|
| Polyethylene | 10.1 |
| Paraffin | 2.9 |
| Copolymer of butadiene and acrylonitrile (25% acrylonitrile) | 4.2 |
| Ester gum | 5.9 |
| Toluol | 60.9 |
| Molybdate orange pigment | 8.0 |
| Lithol red pigment | 8.0 |
| | 100.0 |

Example 7

| | Parts by weight |
|---|---|
| Polyethylene | 11.8 |
| Paraffin | 3.8 |
| Cyclized synthetic polyisoprene | 8.4 |
| Xylol | 60.0 |
| Chrome yellow pigment | 16.0 |
| | 100.0 |

Example 8

| | Parts by weight |
|---|---|
| Polyethylene | 8.4 |
| Paraffin | 3.36 |
| Polymerized 2, 3 dimethyl butadiene | 3.36 |
| Rosin-modified glycerol-phthalate resin | 4.2 |
| Xylol | 64.68 |
| Chrome green pigment | 16.0 |
| | 100.0 |

Example 9

| | Parts by weight |
|---|---|
| Polyethylene | 10.6 |
| Paraffin | 3.5 |
| Polymerized butadiene 1,3 | 5.3 |
| Toluol | 68.6 |
| Iron blue pigment | 12.0 |
| | 100.0 |

A further modification of the printing inks of the present invention is the preparation of printing inks in emulsion form which inks are especially adapted for imprinting polyethylene film and which have the same properties in the imprinted ink film as the printing inks illustrated above. Such printing inks are of the so-called water in lacquer emulsion type inks, the so-called lacquer phase consisting of the ink vehicles hereinbefore described and containing coloring matter dispersed therein. One advantage of preparing the printing inks of the present invention in emulsion form lies in the fact that the body or consistency of the printing inks, and the viscosity thereof, can be varied and modified to meet the requirements of various printing operations for which the printing inks set forth above might not be particularly suitable, without changing the solids concentration of the vehicle portion of the printing inks and without changing the relative proportions of the various components of the binder composition of the ink vehicle with respect to one another. It is further not believed that emulsion printing inks particularly adapted for imprinting continuous self-supporting polyethylene films have hitherto been successfully prepared.

Substantially stable emulsion printing inks may be prepared, according to the present invention, by merely incorporating into the inks compositions above described and represented by the above illustrative examples, under high speed agitation conditions, from approximately 5 percent to approximately 20 percent by weight of water based upon the weight of the finished ink. No emulsifying agents are required to be added to form the emulsion printing inks of the present invention since the vehicles of the present invention have the apparent facility of forming stable emulsions with water. However, incorporation of water into the printing inks of the present invention to form emulsion printing inks provides inks of substantially increased viscosity, and the amount of water therefore which should be utilized will depend upon the particular printing operation and upon the desired viscosity.

The following are illustrative of emulsion printing inks having the character of the printing inks of the present invention.

Example 10

| | Parts by weight |
|---|---|
| Ink of Example 1 | 90 |
| Water | 10 |
| | 100 |

Example 11

| | Parts by weight |
|---|---|
| Ink of Example 2 | 85 |
| Water | 15 |
| | 100 |

Example 12

| | Parts by weight |
|---|---|
| Ink of Example 3 | 80 |
| Water | 20 |
| | 100 |

As stated, the above examples are merely illustrative of emulsion printing inks prepared according to the present invention. Similar printing inks can be prepared by incorporating water into any of the printing inks of Examples 1 to 9 in the proportions hereinbefore set out. Such printing inks may satisfactorily be employed for imprinting polyethylene film which may thereafter be subjected to the thermal treatment described herein to provide imprinted ink films having the characteristics of those obtained by the use of the printing inks of Examples 1 to 9.

One explanation which may account for the fact that substantially permanent adhesion of the imprinted ink films of the inks of the present invention with a base polyethylene film is obtained by heat treating the imprinted polyethylene film may be as follows.

While the polyethylene component of the binder composition is not soluble in the aromatic hydrocarbon solvents utilized in the printing ink of the present invention either at room temperature or at ordinary printing temperatures, the said component is present therein in highly dispersed form. When the printing inks of the present invention are imprinted upon a base polyethylene film, the polyethylene resin in the imprinted ink film is still in a completely dispersed condition. However, when the imprinted polyethylene film is subjected to a heat treatment as outlined above, the dispersed polyethylene component of the binder composition apparently softens or melts to some extent, forms a homogeneous or blended film with the remainder of the components of the binder composition and, at the same time, becomes fused to the base polyethylene film, such fusion apparently taking place more readily due to the presence of the paraffin in the ink film. Upon cooling, the imprinted ink film becomes a substantially integral part of the base film upon which imprinted. As a result the imprinted ink film is highly resistant to deterioration thereof, or to changes in the character or appearance of the ink film as imprinted.

While the above products constitute preferred embodiments of the present invention, changes may be made therein without departing from the scope of the present invention as defined in the appended claims.

What is claimed is:

1. A printing ink adapted for imprinting polyethylene film comprising a water in lacquer emulsion, the lacquer phase having pigment dispersed therein and comprising a vehicle containing, for approximately 20 percent to 30 percent by weight thereof, a binder composition comprising approximately 6 to 14 parts by weight of polyethylene, approximately 3 to 7 parts by weight of paraffin wax, the ratio of polyethylene to paraffin wax being within the range of from approximately 2 to 1 to approximately 4 to 1, and approximately 4 to 10 parts by weight of a material selected from the group consisting of natural rubber, polymerized 2-chloro-butadiene 1,3, polymerized 2,3 dimethyl butadiene, polymerized butadiene 1,3, a copolymer of isobutylene and butadiene, a copolymer of butadiene and styrene, a copolymer of butadiene and acrylonitrile, and cyclized synthetic polyisoprene, the remainder of the vehicle comprising an aromatic hydrocarbon solvent.

2. A printing ink adapted for imprinting polyethylene film comprising a water in lacquer emulsion, the lacquer phase having pigment dispersed therein and comprising a vehicle containing, for approximately 20 percent to 30 percent by weight thereof, a binder composition comprising approximately 6 to 14 parts by weight of polyethylene, approximately 3 to 7 parts by weight of paraffin wax, the ratio of polyethylene to paraffin wax being within the range of from approximately 2 to 1 to approximately 4 to 1, and approximately 4 to 10 parts by weight of natural rubber, the remainder of the vehicle comprising an aromatic hydrocarbon solvent.

3. A printing ink adapted for imprinting polyethylene film comprising a water in lacquer emulsion, the lacquer phase having pigment dispersed therein and comprising a vehicle containing, for approximately 20 percent to 30 percent by weight thereof, a binder composition comprising approximately 6 to 14 parts by weight of polyethylene, approximately 3 to 7 parts by weight of paraffin wax, the ratio of polyethylene to paraffin wax being within the range of from approximately 2 to 1 to approximately 4 to 1, and approximately 4 to 10 parts by weight of polymerized 2-chloro-butadiene 1,3, the remainder of the vehicle comprising an aromatic hydrocarbon solvent.

4. A printing ink adapted for imprinting polyethylene film comprising a water in lacquer emulsion, the lacquer phase having pigment dispersed therein and comprising a vehicle containing, for approximately 20 percent to 30 percent by weight thereof, a binder composition comprising approximately 6 to 14 parts by weight of polyethylene, approximately 3 to 7 parts by weight of paraffin wax, the ratio of polyethylene to paraffin wax being within the range of from approximately 2 to 1 to approximately 4 to 1, and approximately 4 to 10 parts by weight of a copolymer of isobutylene and butadiene, the remainder of the vehicle comprising an aromatic hydrocarbon solvent.

5. A printing ink adapted for imprinting polyethylene film comprising a water in lacquer emulsion, the lacquer phase having pigment dispersed therein and comprising a vehicle containing, for approximately 20 percent to 30 percent by weight thereof, a binder composition comprising approximately 6 to 14 parts by weight of polyethylene, approximately 3 to 7 parts by weight of paraffin wax, the ratio of polyethylene to paraffin wax being within the range of from approximately 2 to 1 to approximately 4 to 1, and approximately 4 to 10 parts by weight of a copolymer of butadiene and styrene, the remainder of the vehicle comprising an aromatic hydrocarbon solvent.

6. A printing ink adapted for imprinting polyethylene film comprising a water in lacquer emulsion, the lacquer phase having pigment dispersed therein and comprising a vehicle containing, for approximately 20 percent to 30 percent by weight thereof, a binder composition comprising approximately 6 to 14 parts by weight of polyethylene, approximately 3 to 7 parts by weight of paraffin wax, the ratio of polyethylene to paraffin wax being within the range of from approximately 2 to 1 to approximately 4 to 1, and approximately 4 to 10 parts by weight of a copolymer of butadiene and acrylonitrile, the remainder of the vehicle comprising an aromatic hydrocarbon solvent.

7. A printing ink according to claim 1 in which the aromatic hydrocarbon solvent is xylol.

8. A printing ink according to claim 1 in which the aromatic hydrocarbon solvent is toluol.

MERRILL R. MAY.

REFERENCES CITED

The following references are of record in the file of this patent:

UNITED STATES PATENTS

| Number | Name | Date |
|---|---|---|
| 2,386,674 | Flint et al. | Oct. 9, 1945 |

FOREIGN PATENTS

| Number | Country | Date |
|---|---|---|
| 613,018 | Great Britain | Nov. 22, 1948 |